United States Patent Office 3,048,444
Patented Aug. 7, 1962

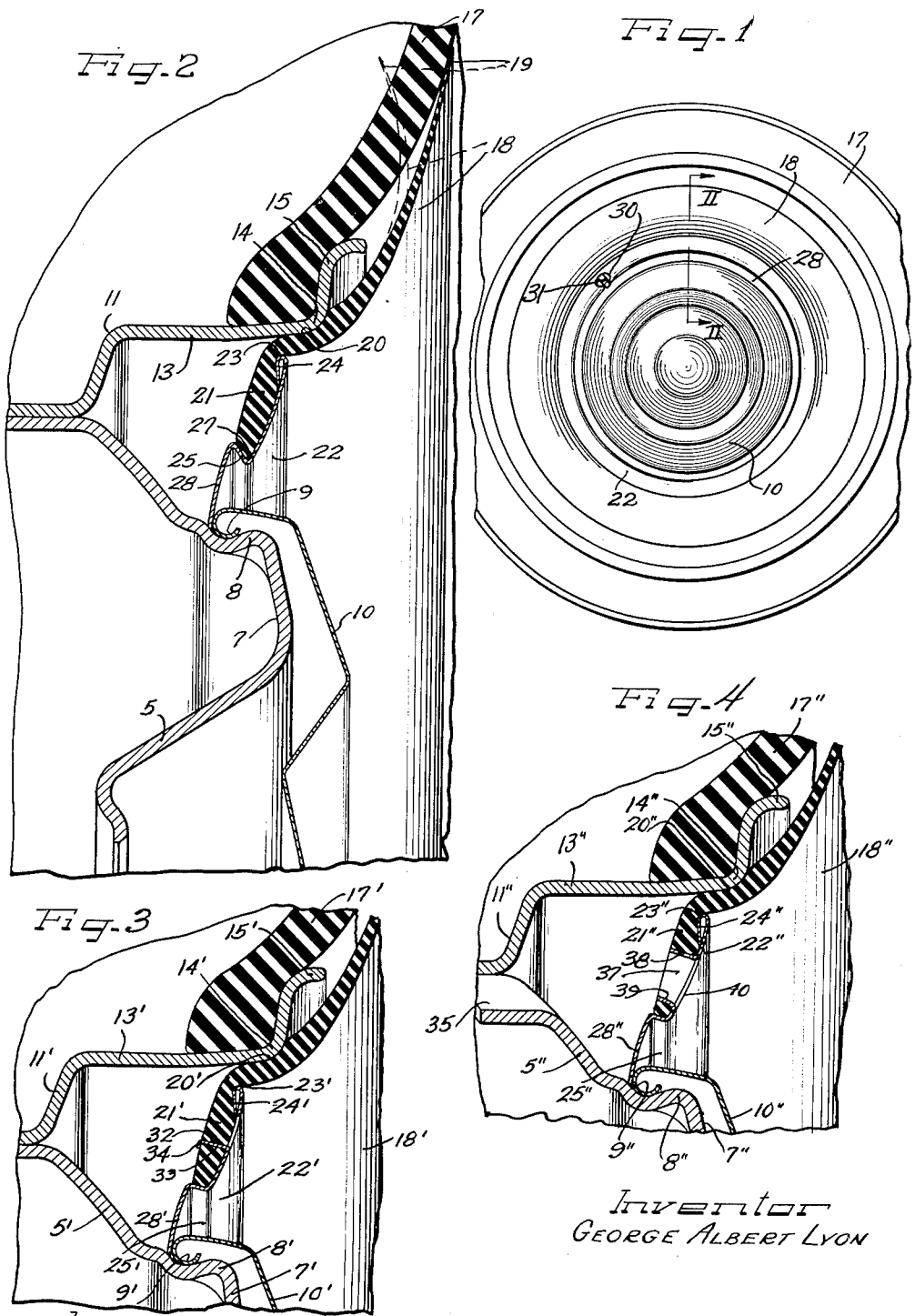

3,048,444
WHEEL COVER
George Albert Lyon, Detroit, Mich., assignor to Lyon Incorporated, Detroit, Mich., a corporation of Delaware
Filed Nov. 22, 1957, Ser. No. 698,215
5 Claims. (Cl. 301—37)

The present invention relates to improvements in wheel structures and more particularly concerns the provision of novel means for providing a wheel with a simulated white or other colored sidewall for a tire on the wheel.

For ornamental purposes, automobile tires are commonly provided with white sidewalls, the remainder of the tire being of a more or less black appearance. The white rubber used for the white sidewall is applied as a veneer and is of a different composition from the remainder or body of the tire and actually requires a different vulcanizing treatment to the extent that the temperature and time of cure are somewhat different than for the black rubber of the tire body. This has created some necessity for compromise in the vulcanization of tires with white sidewalls, generally resulting in a sacrifice of quality in the body of the tire including the tread and principal sidewall portions thereof.

To overcome the disadvantages of cure compromise, it has been proposed to secure the white sidewall portion or veneer to the sidewall of the tire after the tire has been vulcanized. Such after-attached sidewall members are inherently liable to such disadvantages as peeling, and the like, and of course require a separate attaching or vulcanizing operation that raises costs.

It has also been heretofore proposed to provide separate simulated white sidewall ring members that are secured clampingly between the terminal flange of the tire rim and the bead portion of the tire and separably hug the sidewall of the tire. Such simulated or mock tire white sidewall rings require, of course, that the tire be deflated in order to install the ring members. Should such simulated white sidewall rings become damaged, it is necessary to deflate the tire not only to remove the damaged ring but also to replace the ring. Furthermore, a disadvantage of such simulated white sidewall rings is that, especially with tubeless tires, there is interference with proper sealing, gripping engagement of the tire bead portion with the opposing surfaces of the tire rim and more particularly the terminal flange between which and the tire bead the simulated white sidewall ring is clampingly interposed.

It is accordingly an important object of the present invention to overcome the foregoing difficulties and disadvantages of the prior expedients and to provide a simulated tire sidewall of improved appearance and which can be applied, or removed, or replaced without disturbing the tire.

Another object of the invention is to provide an improved tire sidewall simulating member which serves also as means for covering the tire rim terminal flange as well as wheel balancing weights that may be carried by such flange.

A further object of the invention is to provide a novel tire sidewall simulating ring member, which is adapted to be so related to the outer side of the tire and the tire rim that the tire is afforded a deeper, more massive appearance.

Still another object of the invention is to provide a novel tire sidewall simulating ring member or assembly which is adapted for optional assembly with a wheel.

Yet another object of the invention is to provide a tire sidewall simulating flexible, non-metallic ring member which is adapted to be carried in clamped engagement with the outer side of a tire rim.

A still further object of the invention is to provide an improved trim ring assembly for vehicle wheels.

It is also an object of the invention to provide a non-metallic tire sidewall simulating ring device affording substantial possibilities for variable, distinctive ornamental effects.

Other objects, features and advantages of the present invention will be readily apparent from the following detailed description of certain preferred embodiments thereof, taken in conjunction with the accompanying drawing, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a fragmentary enlarged radially sectional view similar to FIG. 2 but showing a modification of the trim ring; and FIGURE 4 is a similar sectional view showing still another modification.

Having reference to FIGS. 1 and 2, the invention is depicted in association with a vehicle wheel such as an automobile wheel including a disk spider wheel body 5 having an intermediate annular axial outwardly reprojecting nose bulge 7 provided at its radially outer side with the hub cap retaining bumps 8 whereby a resilient annular edge bead 9 of a hub cap 10 is adapted to be engaged and retained by snap-on, pry-off retaining coaction. At its radially outer margin the wheel body 5 carries a multi-flange, drop center tire rim 11 having an intermediate annular axially outwardly extending flange 13 merging on a rounded annular shoulder 14 with a terminal flange 15. A pneumatic tire 17 such as a tubeless tire is adapted to be carried by the tire rim.

For affording the appearance of the tire 17 having a white or otherwise colored sidewall, a non-metallic rubber or rubber-like ring member 18 is provided which is of a diameter to overlie the tire sidewall radially outwardly from the terminal flange 15, and to extend into overlying relation to the tire rim and more particularly the terminal flange 15 and the intermediate flange 13. To this end, the sidewall simulating ring member 18 may be made from suitable material such as synthetic rubber, of which butyl rubber is a satisfactory material, and possessed of characteristics such as good pigmentation control, resilient elasticity and form sustaining qualities among others, advantageous for the present purpose.

At its radially outer margin the ring member 18 is preferably of a relatively thin, and in this instance generally feathered formation to provide a tire sidewall hugging tip or outer marginal extremity 19. Normally, the sidewall hugging extremity 19 extends generally more axially inwardly in an arched manner, as depicted in dash outline in FIG. 2, so that in the assembled relationship on the wheel the radially outer marginal portion of the ring will be deflected axially outwardly into generally the full outline position for thereby placing the same under resilient tension, thrusting the terminal portion 19 in face-to-face relation against the tire sidewall for self-positioning and for following flexibly any changes in shape or movement of the tire sidewall in service.

From its tip 19, the trim member body extends generally radially and axially inwardly in more or less arched outwardly convex shape generally simulative of a tire sidewall, and with the body becoming progressively thicker toward its radial inner margin for form sustaining stability. On its inner side or face, the ring member 18 is of a generally concave cross-sectional shape on an arch or radius enabling the ring to overlie the terminal flange 15 in spaced relation to afford with the terminal flange a chamber within which wheel balancing weights may be accommodated effectively. On the inner side of its inner margin, the ring member is provided with a generally arcuate annular groove 20 more or less conformable with the tire rim shoulder 14 to seat thereon in centered relation, with the inner portion of the margin that is located generally axially inwardly from the groove being disposed for telescopic disposition engageably with the axially outer portion of the inner face of the tire rim intermediate flange 13.

For retaining the ring member 18 on the outer side of the wheel, means are provided for engagement with the inner margin of the ring and coactive with the hub cap 10 or more particularly the retaining terminal bead 9 thereof. To this end, a generally radially inwardly extending annular terminal flange 21 of the ring member is interlockingly engaged with a relatively rigid retaining ring member 22 which may be made from metallic strip or sheet such as stainless steel, brass, aluminum or the like, although it may also be made from suitable plastic material of a substantially rigid type. The construction and relationship of the ring member flange 21 and the retaining ring member 22 to one another and to the wheel is such that while the retaining ring member 22 is held in position by the hub cap 10, the ring member 18 is held in position in generally clamped relationship against the tire rim.

In a desirable form, the retaining ring member 22 and the inner marginal flange 21 of the sidewall ring member are interconnected in a generally tongue and groove relationship. To this end, the ring member flange 21 is preferably of a thickened cross-section for substantial resilient stiffness and provided at juncture with the body of the ring member 18 with an annular indented-like or depressed generally radially inwardly and axially outwardly opening groove 23 receptive of an outer turned edge bead-like reinforcing and finishing flange structure 24 of the retaining ring member 22. From the turned edge 24, the body of the retaining ring member 22 extends on a generally transversely arched, axially outwardly convex and axially inwardly concave form to an intermediate annular generally underfolded or tunred, generally radially outwardly and axially inwardly sloping annular flange 25 defining with the inner side of the body of the ring member 22 a generally radially outwardly opening annular groove 27. Within this groove 27 the radially inner extremity of the ring member flange 21 fits interlockingly tongue-like under preferably slightly resiliently tensioned or elastic thrust. This assures retention of the ring flange 21 in assembled relation with the retaining ring member 22 against relative axial displacement.

For engagement with and retention on the wheel, the retaining ring member 22 is provided with a generally radially inwardly extending annular inner marginal flange 28 projecting as an extension from the inner extremity of the intermediate interlock flange 25. The inner diameter of the flange 28 is such as to enable free passage past the retaining bumps 8 on the wheel body and engagement with the wheel body 5 in retaining clamped relation behind the hub cap retaining bead 9, with the retaining bead bearing in firm clamping engagement against the inner marginal extremity of the flange 28. It will be observed that the width of the retaining flange 28 is such that an ample gap is afforded between the margin of the hub cap 10 and the axially outwardly offset juncture between the body of the ring 22 and the interlock flange 25 so as to enable ready access of a pry-off tool applied behind the retaining bead 9 of the hub cap in prying the hub cap from the wheel.

In applying the tire sidewall simulating ring assembly to the outer side of the wheel, it is generally centered with respect to the wheel before the hub cap 10 is applied to the wheel, and with a valve stem opening 30 (FIG. 1) registered with a valve stem 31 that projects from the tire rim. In the thus assembled relationship of the ring assembly with the outer side of the wheel, the inner margin of the retaining flange 28 opposes the wheel body 5 adjacent to the retaining bumps 8. After such preliminary assembly of the ring 18 has been completed, the hub cap 10 is snapped into the retained engagement with the retaining bumps 8 and thereby serves to lock the ring assembly in place by clamping the inner margin of the retaining flange 28 against the wheel body. In this final assembled relationship, the turned outer edge bead 24 of the retaining ring member 22 directly opposes in limited gap relation the intermediate flange 13 in substantially axially inwardly offset relation to the rim shoulder 14, and by bearing into the sidewall ring groove 23 maintains the intervening inner marginal portion of the sidewall ring 18 in snug engagement with the tire rim shoulder 14 and the axially outer portion of the intermediate flange 13, and cooperates with the interlock flange 25 to maintain the thickened ring flange 21 in a locked, retained and substantially inescapably retained relationship to the wheel. By having the gap between the outer edge of the retaining ring 22 and the adjacent face of the intermediate flange 13 less than the thickness of the rib flange 21, further assurance against pulling out of the retained flange 21 is afforded. Removal of the ring assembly may be effected by first removing the hub cap 10.

Where a more positive retaining inter-engagement between the sidewall ring member and the retaining ring member of the ring assembly is desired, the modification of FIG. 3 may be utilized. In this modification details of the wheel and of the ring assembly are substantially the same as in FIGS. 1 and 2 with the exceptions to be noted, and for this reason similar parts are identified by primed reference numerals, it being understood that the description therefor in the first instance applies equally in this instance.

In the FIG. 3 form, the intermediate offsetting flange 25' may or may not provide an interlock groove with the body of the ring member 22', being shown as merely an offsetting flange with the inner edge of the ring member inner marginal flange 21' abutting the same. In this form, however, a suitable circumferentially spaced series of retaining tabs 32 is struck generally axially inwardly from the body portion of the retaining ring 22' and such tabs extend through suitable slots 33 in the flange 21', with turned retaining terminals 34 on the tabs engaging behind the flange 21' at the axially inner ends of the slots 33. Through this arrangement a thorough retention of the retained ring flange 21' is assured both with respect to axial relative disposition of the sidewall ring member 18' and the retaining ring member 22' and with respect to radial assembly and resistance to pull out.

In FIG. 4 another modification including positive retaining interlocking means is provided, coupled with means enabling air circulation through the wheel and the trim ring assembly. To this end, the wheel body 5" is provided with openings 35 therethrough adjacent to juncture with the tire rim 11" and the inner marginal flange 21" of the sidewall ring member 18" is provided with an annular series of circumferentially spaced openings 37 therethrough which in the assembly are generally aligned with the wheel openings 35. Interlocking retention of the ring flange 21" with the retaining ring 22" is effected by provision of struck out retaining lug tab flanges 38 and 39 projecting generally axially inwardly and engaging in this instance the radially outer and inner edges, respectively, defining the openings 37. By the striking out of the retaining flanges 38 and 39, respective openings 40 are provided in the retaining ring 22" matching the openings 37 in the flange 21" interlocked therewith. Thereby, not only is the assembly of the retaining ring and sidewall ring into a trim ring unit effected, but air circulation through the wheel and the trim ring is enabled. It will be appreciated, of course, that insofar as other details of the wheel and the ring assembly are concerned, the double primed reference numerals corresponding to reference numerals of FIGS. 2 and 3 indicate substantial identity of the referenced structure and function.

It will be understood that modifications and variations may be effected without departing from the scope of the novel concepts of the present invention.

I claim as my invention:

1. In a wheel structure including a tire rim having an intermediate generally radially inwardly facing flange joining at its axially outer end a terminal flange with a shoulder that faces generally radially inwardly and axially outwardly at juncture of the flanges, the tire rim being adapted for supporting a pneumatic tire having an outer sidewall, a circular trim structure for disposition over the outer side of the wheel including a non-metallic annular tire sidewall simulating flexible ring member dimensioned to overlie the tire sidewall and the terminal flange and having an inner marginal portion seating on the rim shoulder and projecting generally telescopically axially inwardly in engagement with the axially outer portion of the intermediate flange and having projecting from the telescoped portion a generally radially inwardly extending portion, a substantially rigid circular retaining member having a radially outer edge of a diameter to engage in opposed relation to said axially outer portion of the intermediate flange and offset axially inwardly substantially relative to said shoulder and in a gap relation to the intermediate flange slightly less than the thickness of the telescoped portion of the ring member so as to maintain the inner portion of the ring member in snug engagement with the rim shoulder and the portion of the intermediate flange telescoped thereby, said circular member having means thereon supplementing said edge and engaging the inwardly projecting inner portion of the ring member to interlock it against escape from said circular member and from said axially outer portion of the intermediate flange and said shoulder, and means for detachably securing said circular member to the wheel.

2. In a wheel structure including a tire rim having an intermediate generally radially inwardly facing flange joining at its axially outer end a terminal flange with a shoulder that faces generally radially inwardly and axially outwardly at juncture of the flanges, the tire rim being adapted for supporting a pneumatic tire having an outer sidewall, a circular trim structure for disposition over the outer side of the wheel including a non-metallic annular tire sidewall simulating flexible ring member dimensioned to overlie the tire sidewall and the terminal flange and having an inner marginal portion seating on the rim shoulder and projecting generally telescopically axially inwardly in engagement with the axially outer portion of the intermediate flange and having projecting from the telescoped portion a generally radially inwardly extending portion, a substantially rigid circular retaining member having a radially outer edge of a diameter to lie in opposed relation to said axially outer portion of the intermediate flange and offset axially inwardly substantially relative to said shoulder and in a gap relation to the intermediate flange and maintaining the inner portion of the ring member in snug engagement with the rim shoulder, said circular member having means thereon supplementing said edge and engaging the inwardly projecting inner portion of the ring member to interlock it against escape from said circular member and from said axially outer portion of the intermediate flange and said shoulder, and means for detachably securing said circular member to the wheel.

3. In a wheel structure including a tire rim having an intermediate generally radially inwardly facing flange joining at its axially outer end a terminal flange with a shoulder that faces generally radially inwardly and axially outwardly at juncture of the flanges, the tire rim being adapted for supporting a pneumatic tire having an outer sidewall, a circular trim structure for disposition over the outer side of the wheel including a non-metallic annular tire sidewall simulating flexible ring member dimensioned to overlie the tire sidewall and the terminal flange and having an inner marginal portion seating on the rim shoulder and projecting generally telescopically axially inwardly in engagement with the axially outer portion of the intermediate flange and having projecting from the telescoped portion a generally radially inwardly extending portion, a substantially rigid circular retaining member having a radially outer edge of a diameter to lie in opposed relation to said axially outer portion of the intermediate flange and offset axially inwardly substantially relative to said shoulder and in a gap relation to the intermediate flange and maintaining the inner portion of the ring member in snug engagement with the rim shoulder, said circular member having means thereon supplementing said edge and engaging the inwardly projecting inner portion of the ring member to interlock it against escape from said circular member and from said axially outer portion of the intermediate flange and said shoulder, and means for detachably securing said circular member to the wheel, said supplementing means including a generally axially extending flange spaced radially inwardly from said radially outer edge and engaged by the radially inner extremity of said inwardly projecting inner portion of the ring member.

4. In a wheel structure including a wheel body carrying a hub cap in press-on, pry-off relation and supporting a tire rim having an intermediate generally radially inwardly facing flange joining at its axially outer end a terminal flange with a shoulder that faces generally radially inwardly and axially outwardly at juncture of the flanges, the tire rim being adapted for supporting a pneumatic tire having an outer sidewall, a circular trim structure for disposition over the outer side of the wheel including a non-metallic annular tire sidewall simulating flexible ring member dimensioned to overlie the tire sidewall and the terminal flange and having an inner marginal portion seating on the rim shoulder and projecting generally telescopically axially inwardly in engagement with the axially outer portion of the intermediate flange and having projecting from the telescoped portion a generally radially inwardly extending portion, a substantially rigid circular retaining member having a radially outer edge of a diameter to lie in opposed relation to said axially outer portion of the intermediate flange and offset axially inwardly substantially relative to said shoulder and in a gap relation to the intermediate flange and maintaining the inner portion of the ring member in snug engagement with the rim shoulder, said circular member having means thereon supplementing said edge and engaging the inwardly projecting inner portion of the ring member to interlock it against escape from said circular member and from said axially outer portion of the intermediate flange and said shoulder, and means for detachably securing said circular member to the wheel, said circular member having an inner edge adjacent to the wheel body and engaged by the hub cap for thereby retaining the circular member on the wheel.

5. In a wheel structure including a wheel body and a tire rim supported thereby and arranged to carry a pneumatic tire having an outer side wall, the wheel body having air circulation openings therethrough adjacent to the tire rim, a wheel and tire trim assembly including a non-metallic tire sidewall simulating ring of a diameter to overlie the sidewall of the tire and having a radially inner portion to overlie the wheel openings in axially outwardly spaced relation thereto, a circular metallic member having a radially outer portion overlapping said radially inner portion of the non-metallic ring member, a circumferentially spaced series of registering openings through the overlapped portions of the ring member and the circular member and providing for circulation of air therethrough and through the wheel openings, retaining flanges struck from the openings in the circular member and engaging said radially inner portion of the ring member within the openings thereof and interlockingly retaining the members together, and means for detachably securing a radially inner portion of said circular member to the wheel for thereby maintaining the trim assembly on the wheel.

References Cited in the file of this patent

UNITED STATES PATENTS

| | | |
|---|---|---|
| 1,896,875 | Walters | Feb. 7, 1933 |
| 2,368,252 | Lyon | Jan. 30, 1945 |
| 2,368,254 | Lyon | Jan. 30, 1945 |
| 2,498,851 | Doty | Feb. 28, 1950 |
| 2,724,877 | Ramsay | Nov. 29, 1955 |
| 2,757,973 | Lyon | Aug. 7, 1956 |
| 2,937,903 | Wood | May 24, 1960 |
| 2,964,357 | Barnes | Dec. 13, 1960 |

FOREIGN PATENTS

| | | |
|---|---|---|
| 1,061,278 | France | Nov. 23, 1953 |